UNITED STATES PATENT OFFICE.

THEODORE WILLIAM HEINEMANN, OF NEW YORK, N. Y.

IMPROVED METHOD OF SEASONING AND PRESERVING WOOD.

Specification forming part of Letters Patent No. 94,204, dated August 31, 1869; antedated August 17, 1869.

*To all whom it may concern:*

Be it known that I, THEODORE WILLIAM HEINEMANN, of the city of New York, have invented a new and Improved Method of Seasoning, Beautifying, and Preserving Wood and other porous materials, and rendering the same impervious to the action of the elements.

The nature of my invention consists in saturating wood, or other porous materials, with any solution or substance which may be used for seasoning and preserving the same, by means of the application of steam-pressure, generated from volatile liquids, or from a compound of volatile liquids and water.

To enable others skilled in the art to which my invention applies to make and use the same, I will proceed to describe the same fully.

One retort, tank, or boiler is sufficient to perform the process in; but, for carrying it out on a larger scale, I find that an apparatus consisting of a series of boilers, connected with each other by tubes, and with appropriate pumps, condensers, &c., &c., is best adapted.

For the purpose of this description I will assume the use of but one boiler, and that the object to be impregnated is a log of hard wood of the size of a railroad-sleeper. The boiler, provided with a man-hole, is packed with the wood. Enough of the impregnating substance to submerge the wood is introduced, and a small quantity of alcohol, wood-alcohol, ether, or some other volatile liquid is added, and the boiler closed. Some water may be intermixed with the alcohol, as the steam to be generated may consist of about sixty-six parts of the vapor of alcohol, &c., and thirty-four parts of the vapor of water.

I have mentioned the ratio of sixty-six parts of alcohol, &c., vapor, and thirty-four parts of water-vapor, as the composition of the steam; but I do not mean to confine my invention to this ratio, as the addition of any quantity, however small, to the water in the boiler will increase the elasticity of the steam, and the vapor of alcohol, &c., without any vapor of water, will accomplish its purpose.

I have only mentioned this ratio as a cheap and convenient proportion.

Heat being applied to the boiler, the alcohol is rapidly converted to vapor.

If any water is intermixed with the alcohol, be it water added, or water from the sap contained in the wood, the water will be converted to vapor soon thereafter, and then two different vapors.

This mixture of vapors (according to the proportion above mentioned) will attain a pressure of about forty pounds at a temperature of 212° Fahrenheit. At this temperature the impregnating substances generally attain their greatest limpidity; and the temperature must be increased or lowered, according to amount of steam-pressure required, which depends on the different qualities of the impregnating substances used, on the different quality of the wood or other material which is to be impregnated, the size thereof, and the purposes to which it is to be applied.

When the necessary heat to attain the required pressure is secured, any vapor which may be in the pores of the wood is expelled by the heavier liquefied impregnating substances being pressed in the pores with a force equal to the pressure which the steam in the boiler has attained.

The wood is continued in the boiler, under the same pressure, until the pores are thoroughly filled with the impregnating substance, when the remaining portion of the impregnating substance is drained off, and the wood removed and cooled.

It is evident that the duration of the process is dependent on the same circumstances which control the intensity of the pressure; and I will state that, for the thorough saturation of a piece of hard wood of the size of a railroad-sleeper with a resinous impregnating substance, seventy-five pounds of gage-pressure is required, which I attain at a temperature of 265° Fahrenheit, and that the process is completed in about five hours from the time the above pressure is first attained.

Seventy-five to eighty pounds of gage-pressure is the highest pressure required for the impregnation of any porous material with any kind of suitable impregnating substance; and this pressure I can attain at a temperature of 290° Fahrenheit.

From the description of the operation of this process as applied to a piece of wood, those conversant with processes of this character will readily understand how to apply my process on other porous materials, if, in fact, it is applied to any material in substantially the same manner, only that the intensity of the pressure and the length of time must be varied.

After the process is completed, the wood or other material will be found solidified, strengthened, and (if the proper impregnating substances are used) impervious to the action of the elements; and the color of the wood or other material will be found changed; and, as coloring matter may be added to the impregnating substances, the change of color is under the control of the operator.

I claim as my invention, and desire to secure by Letters Patent of the United States—

1. Generating steam by heating alcohol or other volatile liquids, solely, or in combination with water, substantially in the manner described, and for the purpose mentioned.

2. Impregnating wood or other porous materials by infusing in the pores thereof impregnating substances, by means of the pressure of steam generated from volatile liquids, solely, or in combination with water, substantially in the manner described, and for the purpose mentioned.

3. Saturating wood or other porous materials with impregnating substances by means of steam-pressure attained at a temperature lower than 290° Fahrenheit.

THEO. WM. HEINEMANN.

Witnesses:
HENRY WEHLE,
G. ZIMMERMANN.